United States Patent [19]

DeSalve

[11] Patent Number: 4,469,275

[45] Date of Patent: Sep. 4, 1984

[54] THERMOSTATIC DEVICE WITH FAIL-SAFE CAPABILITY

[75] Inventor: Dennis W. DeSalve, Findlay, Ohio

[73] Assignee: United Aircraft Products, Inc., Dayton, Ohio

[21] Appl. No.: 458,358

[22] Filed: Jan. 17, 1983

[51] Int. Cl.³ .................................................. G05D 23/12
[52] U.S. Cl. ............................ 236/93 A; 236/DIG. 2; 236/100; 137/73
[58] Field of Search ............. 236/34.5, DIG. 2, 93 A, 236/100, 90; 137/73

[56] References Cited

U.S. PATENT DOCUMENTS

| | | | |
|---|---|---|---|
| 1,952,516 | 3/1934 | Sperry et al. | 236/DIG. 2 |
| 2,425,439 | 8/1947 | Puster | 236/DIG. 2 |
| 2,690,874 | 10/1954 | Stubblefield | 236/DIG. 2 |
| 3,045,918 | 7/1962 | Woods | 236/34 |
| 3,140,721 | 7/1964 | Sullivan | 137/73 |
| 3,289,686 | 12/1966 | Tyer, Jr. | 137/73 |
| 3,498,537 | 3/1970 | Wong | 137/73 X |
| 4,013,218 | 3/1977 | King | 236/34.5 |
| 4,245,782 | 1/1981 | Brown | 236/34.5 |
| 4,303,197 | 12/1981 | Sandau | 137/73 X |

Primary Examiner—William E. Tapolcai
Attorney, Agent, or Firm—J. E. Beringer

[57] ABSTRACT

A device in a fluid flow path moves to perform a fluid flow control operation at a predetermined high fluid temperature. A mechanism normally locked out of participation in the movements of the device is released at a selected fluid temperature higher than the predetermined fluid temperature and compels the device to a performance of the control operation. The thermostatic device and the locking and release mechanism are incorporated in a unitary structure insuring the carrying out of a control function even when elements of the device having primary responsibility therefor fail or respond inadequately.

8 Claims, 5 Drawing Figures

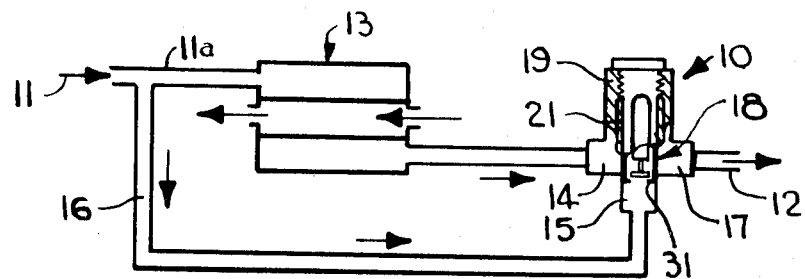
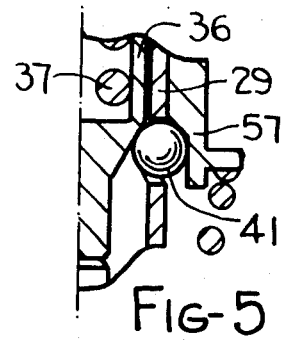
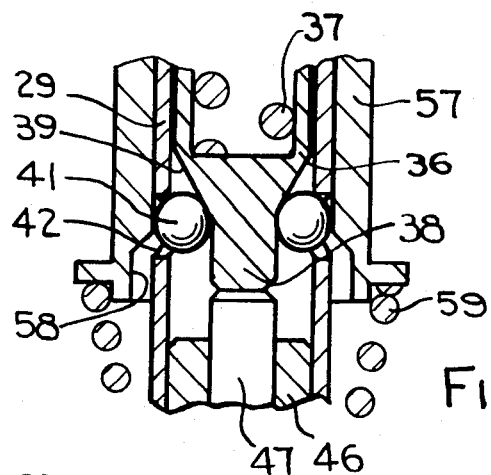
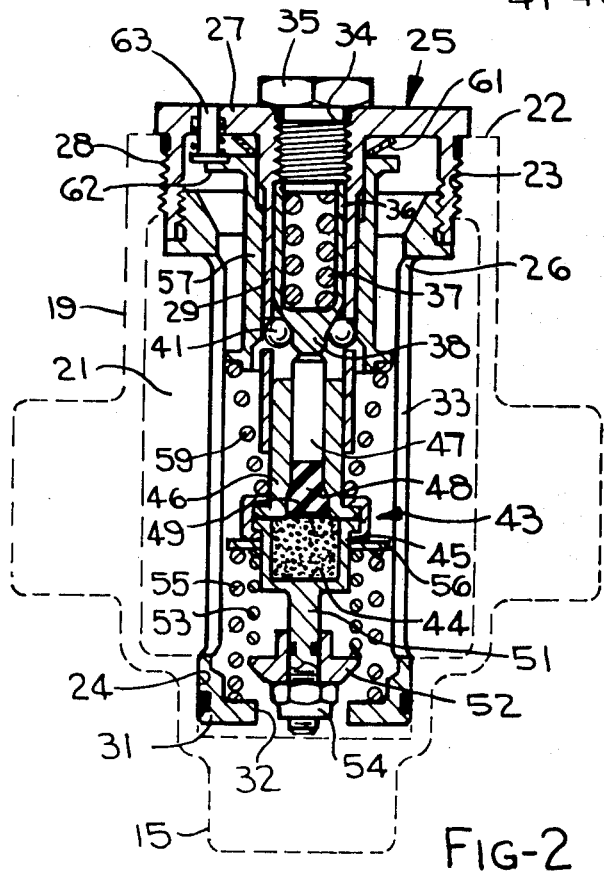
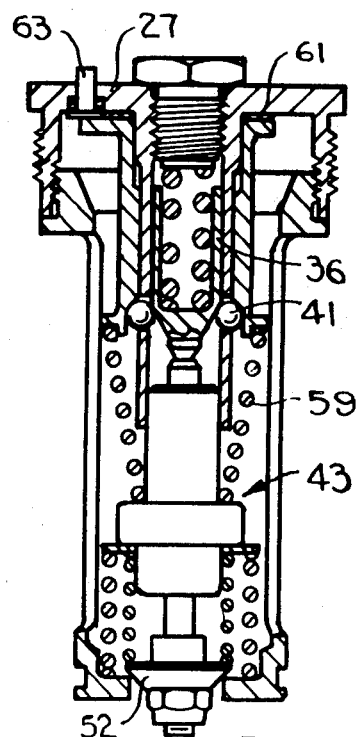

THERMOSTATIC DEVICE WITH FAIL-SAFE CAPABILITY

BACKGROUND OF THE INVENTION

This invention relates to fluid temperature responsive control devices, and particularly to temperature responsive flow control devices having a requirement to assume a particular flow control position in the event of failure of temperature responsive elements to function.

Thermostatic flow control devices are known to be positioned in a fluid flow path and to include a valve which at a predetermined high fluid temperature moves to a selected control position, as for example to close a shortened or bypass route compelling flow by way of a more circuitous route which may include a heat exchanger. Temperature sensitive elements in such devices are regarded as quite reliable but failure or impaired functional ability are not unknown. In some instances, failure or impaired capacity cannot be tolerated. In dealing with high temperature fluids, for example, flow in bypassing relation to a heat exchanger must be shut off or substantially reduced at a predetermined high temperature value to avoid mis-operation or hazards that may be associated with use of an over heated fluid.

Design of the valve assembly or of the system in which the valve functions may be compromised or made unduly complex as designers attempt to deal with this situation. Relatively elaborate steps have been taken to protect the valve against failure. Mechanisms have been introduced whereby response of the valve may be tested under conditions of simulated use as a part of a pre-use check. In some instances truly redundant capability is provided for by arranging two or more thermostatic devices in parallel so that a failure of one will find the other assuming or continuing performance of the desired function. In general, therefore, prior art efforts to cope with the problem of fail-safe operation in thermostatic valves and like devices have led to costly, relatively complex apparatus which often is of limited or uncertain utility.

SUMMARY OF THE INVENTION

The instant invention provides a thermostatic valve device in which the prime valve operater is backed up by a normally inactive mechanism effecting, in the event of failure of the prime operator, to move the valve to a selected fail-safe position. The prime valve operator and the normally inactive mechanism are parts of a single valve assembly which, in accordance with one aspect of the invention, can be installed in and removed from a valve body or housing as a unit. In another invention aspect, a prime operator extends a valve for a control function as temperature above a predetermined high value is sensed, while a normally inactive mechanism, capable of independently extending the valve, is locked out of participation unless and until a still higher temperature value is attained indicating failure in the prime operator. In a feature of the unitary device construction, a part has the dual function of serving as a reactant member for the prime operator and as an actuator for a fail-safe extension of the valve. In another feature, release of the reactant member to function as an actuator is signaled externally of the valve body or housing to indicate a failure in the thermostatic valve assembly.

An object of the invention is to provide a thermostatic valve assembly with a fail-safe capability substantially in accordance with the foregoing.

Other objects and structural details of the invention will appear from the following description when read in connection with the accompanying drawings, wherein:

FIG. 1 is a system diagram incorporating a valve in accordance with the illustrated embodiment of the invention;

FIG. 2 is a view in the longitudinal section of the valve of FIG. 1, showing the valve in a normal open position and with the fail-safe mechanism locked out of participation in the valve operation;

FIG. 3 is a view similar to FIG. 2, showing fail-safe mechanism released and the valve actuated thereby to a closed position, and FIGS. 4 and 5 are detail, relatively enlarged views of locking mechanism in the thermostatic device, shown in respectively different operating positions.

Referring to the drawings, a thermostatic valve assembly in accordance with the invention may take a variety of structural forms and be incorporated in a variety of fluid flowing systems. For illustrative purposes it is shown in FIG. 1 as a bypass control valve unit 10 in a system flowing a fluid from an inlet line 11 to an outlet line 12 either by way of a heat exchanger 13 or in bypassing relation to the heat exchanger. The valve unit 10 has a pair of fluid inlet fittings 14 and 15 to which are connected respective flow lines 11a and 16 leading from inlet line 11 respectively by way of heat exchanger 13 and in bypassing relation to it. A single outlet fitting 17 opens from valve unit 10 to outlet line 12. In valve unit 10 is a thermostatic valve device 18 controlling in-flow at inlet fitting 15.

In operation of the illustrative system, a fluid under pressure and subject to rising temperature is delivered by way of line 11 to be discharged by line 12 to a place of use. Valve device 18 is normally open so that a start-up of the system finds both inlet fittings 14 and 15 open. In view, however, of the flow resistance imposed by heat exchanger 13, the delivered fluid tends principally to reach the valve unit by way of bypass line 16 and inlet fitting 15 at this time. As the fluid temperature rises it has an effect on valve device 18, as will hereinafter more clearly appear, and, at or above a predetermined high fluid temperature value, the valve moves to close off in-flow through inlet fitting 15. Substantially all further flow is by way of line 11a, heat exchanger 13 and inlet fitting 14, with the heat exchanger having a temperature moderating effect on the flowing fluid. Together, the heat exchanger and valve device 18 cooperate in establishing and maintaining a selected, non-hazardous temperature level of the fluid discharging by way of outlet line 12 to the place of use. Should valve device 18 fail, and be unable to close off inlet fitting 15, the system would remain in or revert to a bypassing mode of operation and fluid discharging into outlet line 12 would be allowed to rise to undesirable and possible hazardous or damaging temperature levels. A thermostatic device in accordance with the present invention has a fail-safe capability by which it senses a fluid temperature rise above that normally established and maintained and responds by compelling a closure of inlet fitting 15. Further fluid flow in the system is by way of heat exchanger 13, and, although the thermostatic device may be regarded as having failed in its intended purpose of helping to establish and maintain a selected temperature value, it has failed on the side of safety, that is, by obviating a high temperature build up in the discharging fluid.

The valve unit 10 comprises a body 19 having an interior chamber 21 with which fittings 14, 15 and 17 are in common communication. An upper end of the body 19 forms a wall 22 in which is an opening 23 positioning opposite inlet fitting 15 and an interior cylindrical bore 24 forming an interior continuing part of fitting 15. In the illustrated instance, thermostatic device 18 is in a cartridge form so that it can be inserted in and removed from body 19 as a unit. It includes a housing portion made up of a base 25 and a connected extension 26. The base 25 comprises an end horizontal wall 27 expanded to seat to body wall 22, a first cylindrical projection 28 externally threaded to be fixed thereby in bore 23, and a second cylindrical projection 29 in inwardly spaced, concentric relation to projection 28 and relatively elongated. Extension 26 has a threaded connection to projection 28, for ease of assembly of parts, and extends therefrom as a relatively reduced diameter unitary part of the housing to terminate in a relatively close, sealed fit within body bore 24. At what may be regarded as its outer projecting end, extension 26 has a horizontal wall 31 parallel to wall 27 and formed with an aperture 32 establishing communication between inlet fitting 15 and the interior of extension 26. The latter is open through extension apertures 33 to interior body chamber 21 and is open as well to upper portions of the housing interior adjacent end wall 27.

Inner cylindrical projection 29 is open at its opposite ends, the projection at what may be regarded as an inner or upper end opening through end wall 27 by way of a bore 34 therein. A screw-like closure 35 for bore 34 includes a head portion adapted to engage and limit against wall 27 and a shank portion extending into and in threaded engagement with the interior of projection 29. Received in projection 29 in advance of closure 35 is a cup-shaped part 36 having the dual function of a reactant member and an actuating member. A relatively strong spring 37 is based on closure 35 and bears on part 35 to urge it outwardly or downwardly in projection 29. At its closed outer or lower end, part 36 has a reduced diameter nose portion 38 defining with the closed end of the part an annular shoulder 39. Locking balls 41 surround nose portion 38 and are carried within radial apertures 42 in projection 29 in a manner to cooperate with shoulder 39 in preventing a projection of part 36 by spring 37.

The outer or lower end of projection 29 provides a sliding mount for a thermally sensitive valve assembly 43 which while it may take various forms is in the illustrated instance a thermal power unit of a known type utilizing a confined temperature expansive material 44. A place of confinement for material 44 is defined by an interengaged cup 45 and a sleeve 46, the latter extending into to be guided by the open outer end of projection 29. Sleeve 46 in turn reciprocably mounts a plunger 47 in end to end abutting relation to nose portion 38 of part 36. The plunger 47 forms with a deformable plug 48 and a diaphragm 49 a connecting link between part 36 and material 44. From an end opposite its end of engagement with sleeve 46, the cup 45 projects a shaft 51 axially aligned with and extending into housing opening 32. Shaft 51 mounts a poppet valve 52 utilizing an axially extending motion of shaft 51 to seat to wall 31 in a closing relation to opening 32. So that over travel of shaft 51 may be accommodated, poppet valve 52 is made moveable on shaft 51 and confined normally against motion by the cooperation of a spring 53 and a shaft nut 54.

The thermal power unit 43 is positioned to be affected by a changing temperature of fluid flowing through body 19, whether admitted at inlet fitting 14 or inlet fitting 15. A rise in fluid temperature to or approximately to a predetermined value has the effect of inducing a change in state in the confined material 44 and as a consequence the material expands. Because of the presence of relatively strong spring 37 in a backing relation to part 36 and plunger 47, the expansion of material 44 is accommodated by an axial extension of the assembly comprising sleeve 46, cup 45, shaft 51 and valve 52, relative to projection 29, with the valve being moved thereby to close opening 32. A drop in fluid temperature below its critical, predetermined value allows the material 44 to return to its normal state, whereupon a spring 55 positioning between wall 31 and the thermal power unit restores the described assembly to a normal position, recompressing material 44 and lifting valve 52 from its closed position. For convenience of assembly a plate 56 limiting against an expanded portion of cup 45 may be used as a base for spring 55.

Returning to a consideration of locking balls 41, it will be evident that part 36 continuously attempts, under urging of springs 37, to cam the locking balls 41 out of its path and to deflect them radially outwardly through the apertures 42. Controlling this motion is a sleeve 57 which over most of its length is in close sliding contact with the exterior of projection 29. At and adjacent to an outer or a lower end thereof sleeve 57 is expanded to provide a radial pocket 58 large enough to allow balls 41 to move partly through apertures 42 or far enough to clear shoulder 39 on part 36 and allow the part to be thrust downwardly by spring 37. The sleeve 57 is adapted to occupy alternative positions of control, one of which is shown in FIG. 2 and the other in FIG. 3. It is slidable vertically or axially along projection 29. A compression spring 59 extends between a lower end of the sleeve and cup portion 45 of assembly 43 and urges the sleeve upwardly or toward housing end wall 27. The pressure of spring 59 is normally resisted by a washer or annulus 61 interposed between an upper end of sleeve 57 and end wall 27, the disc-like washer being of bi-metal construction to be deformable as a result of temperature change. The washer has normally a dished or frusto-conical configuration as shown in Fig. 1 and as so formed limits the extent of motion permitted sleeve 57 toward wall 27. Influenced by convection and conduction thermal energy flow, the washer 61 responds to a fluid temperature rise to or above a selected critical value by losing its ability successfully to oppose spring 59, whereupon sleeve 57 moves to an upper limit of motion, as from the position of FIG. 2 to the position of FIG. 3. A radially extending foot 62 on sleeve 57 projects a spring resistant plunger 63 upward through wall 27 when the sleeve rises to its upper limit of motion. This motion is used to give a visual indication or remotely to signal that a lifting of sleeve 57 has taken place.

Operation of the thermostatic fail-safe device will largely be self-evident from the foregoing description and inspection of the drawings to which it refers. Briefly, however, the system normally operates under control of assembly 43 to close inlet fitting 15 when the fluid temperature rises to a predetermined or desired operating value and to open fitting 15 when fluid temperature drops below such predetermined value. Assembly 43 accordingly cooperates with whatever pumping means may be provided and with heat exchanger 13 in delivering fluid to a place of use by way of line 12 at a maintained temperature value. The temperature at which bi-metal washer 61 yields to spring 59 is distinctly above the maintained operating temperature value, so that under normal operating conditions sleeve 57 is held to its lowermost position as shown in Fig. 1. Expanded pocket 58 is at this time projected below or beyond the plane of locking balls 41 and the balls are held in place wedged within apertures 42 between the inner peripheral wall of sleeve 57 and the nose portion 38 of part 36. The part 36 is accordingly at this time locked in a retracted position against the urging of spring 37 and as so positioned acts as a relatively stationary means against which plunger 47 of assembly 43 reacts in a normal extension of valve 52 responsively to expansion of material 44. The screw member 35 closes a route of access to part 36, is adjustable to achieve a selected degree of compression of spring 37 and may provide a positive abutment for part 36.

In the event of failure of assembly 43, and such devices have a few known failure modes, as for example an imperfect confinement of material 44, the assembly becomes incapable of fully projecting valve 52 to a seat in aperture 32. This leaves inlet fitting 15 open or partly open and fluid uncooled at heat exchanger 13 is allowed to reach the interior of unit 10 and thereby delivery line 12. In the present instance, the hazards and potential for mis-operation are avoided by the presence of bi-metal washer 61 and associated parts. If temperature of the fluid reaching and flowing through unit 10 rises through and beyond its predetermined operating level to the selected high temperature value at which the washer is no longer able to resist spring 59, control of sleeve 57 will pass to the spring 59 and the sleeve will move upward to the position of FIG. 2. Locking balls 41 are released thereby to be cammed outwardly into pocket 58 out of the path of motion of part 36. Spring 37 is accordingly free to project the part axially downwardly, and, by virtue of the part's end to end abutting engagement with plunger 47, to project the entire assembly 43 outwardly or downwardly, seating valve 52 in aperture 32. Spring 37, it will be understood, is relatively stronger than spring 55. Accordingly, although the thermostatic device has failed in the sense that it is no longer able to perform its intended function of maintaining a predetermined operating temperature value of the flowing fluid, it has failed on the side of safety. Bypass inlet fitting 15 is closed and all fluid reaching delivery line 12 is required first to pass through heat exchanger 13 and thereby to be cooled. The valve device being of cartridge form may readily be removed and replaced and lends itself to simple partial disassembly if it should be desired to inspect and to reset the locking mechanism. Signaling means 63 remains projected, as long as sleeve 57 continues under the influence of spring 59, and provides a continuing signal that the thermostat is in a failed condition.

What is claimed is:

1. A temperature responding control device having a fail-safe capability, including a relatively stationary body, a member having the dual function of a reactant means and an actuator effectively based on said body and capable of assuming relatively retracted and extended positions, yielding means urging said member to an extended position, means for locking said member in a retracted position, a thermostatic assembly in a fluid flow path in said body engaged at one end by said member to utilize said member as a reactant means and responding to a fluid temperature rise to a predetermined level to project an opposite portion thereof relative to said member for a control operation, and means responding to a rise in fluid temperature selectively higher than said predetermined level to disable said locking means and thereby release said member to function as an actuator to project said thermostatic assembly including said portion thereof for an accomplishment of said control operation despite a failed or inadequate temperature response in said thermostatic assembly.

2. A temperature responsive control device according to claim 1, wherein means are provided responsive to a disabling of said locking means to signal an actuated projection of said assembly by said member, said signaling means being mounted in said body to be relatively projected therein by a portion of said locking means in conjunction with the disabling thereof.

3. A temperature responding control device having a fail-safe capability, including a relatively stationary body, a member having the dual function of a reactant means and an actuator effectively based on said body and capable of assuming relatively retracted and extended positions, yielding means urging said member to an extended position, means for locking said member in a retracted position, a thermostatic assembly in a fluid flow path in said body utilizing said member as a reactant means and responding to a fluid temperature rise to a predetermined level to project a portion thereof relative to said member for a control operation, means responding to a rise in fluid temperature selectively higher than said predetermined level to disable said locking means and thereby release said member to function as an actuator to project said thermostatic assembly including said portion thereof for an accomplishment of said control operation despite a failed or inadequate temperature response in said thermostatic assembly, said body providing a guide interiorly thereof for said member, and said locking means including locking elements substantially carried by said guide to move radially thereof into and out of blocking position relative to said member, a sleeve slidable on said guide into and out of a position holding said locking elements in a radially inwardly locking position blocking motion of said member out of retracted position, said member applying through said yielding means acting thereon a pressure to cam said locking elements radially outwardly out of locking position in the event of movement of said sleeve out of its said holding position, yielding means urging said sleeve out of its said holding position, and a thermally sensitive part resisting the pressure of said last named yielding means and acting to maintain said sleeve in its said holding position at fluid temperature values lower than said selectively high fluid temperature.

4. A temperature responsive control device according to claim 4, wherein said thermally sensitive part has a bi-metal construction and is positioned between an end of said sleeve and a wall of said body and has one configuration at fluid temperature values below said selectively high value and another configuration at fluid temperatures at and above said selectively high values.

5. A temperature responsive control device according to claim 3, wherein said body provides an interior chamber receiving said member and related parts, the said means yieldingly urging said member to an extended position being a compression spring based on a wall portion of said body and said wall portion including removable and adjustable means providing a seat for and adapted to vary the compression of said spring.

6. A temperature responsive control device according to claim 5, wherein said guide projects from said wall portion of said body in a surrounding relation to said member and is open at a relatively projecting end to receive and guide a projecting end portion of said thermostatic assembly, a plunger element accommodated in said end portion extending therefrom for end abutting contact with said member.

7. A temperature responsive control device according to claim 6 wherein said wall portion further has projecting therefrom an elongate, perforate housing in a surrounding relation to said guide and to said thermostatic assembly and forming therewith a cartridge whereby the control device assembly may be installed and removed as a unit.

8. A temperature responsive control device according to claim 7, said elongate housing terminating in an end portion longitudinally spaced from said wall portion and defining another and opposing wall portion, said opposing wall portion including a flow aperture the opening and the closing of which by said portion of said thermostatic assembly constitutes said control operation.

* * * * *